US010228445B2

(12) United States Patent
Hsu et al.

(10) Patent No.: US 10,228,445 B2
(45) Date of Patent: Mar. 12, 2019

(54) SIGNAL PROPAGATING POSITIONING SYSTEM

(71) Applicant: International Business Machines Corporation, Armonk, NY (US)

(72) Inventors: White W. H. Hsu, New Taipei (TW); Joey H. Y. Tseng, Taipei (TW); Yu-Hsing Wu, Taipei (TW); Hsieh-Lung Yang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 15/084,985

(22) Filed: Mar. 30, 2016

(65) Prior Publication Data

US 2017/0285131 A1    Oct. 5, 2017

(51) Int. Cl.
*G01S 3/02*        (2006.01)
*G01S 5/10*        (2006.01)
(Continued)

(52) U.S. Cl.
CPC .............. *G01S 5/10* (2013.01); *G01S 5/0263* (2013.01); *G01S 19/24* (2013.01); *G01S 19/31* (2013.01)

(58) Field of Classification Search
CPC .......... G01S 5/10; G01S 5/0263; G01S 19/24; G01S 19/31
(Continued)

(56) References Cited

U.S. PATENT DOCUMENTS 5,774,829 A  *  6/1998  Cisneros ................ G01S 5/145
                                                        342/457
8,483,725 B2    7/2013  Kim et al.
(Continued)

FOREIGN PATENT DOCUMENTS

CN        101917375 B     4/2013
CN        101620271 B     7/2013
(Continued)

OTHER PUBLICATIONS

Unknown, "ProPay JAK™ Mobile Card Reader," http://www.propay.com/products-services/accept-payments/jak-card-reader/, 2 pgs., printed Mar. 28, 2016 8:56 AM.
(Continued)

*Primary Examiner* — Chuong P Nguyen
(74) *Attorney, Agent, or Firm* — Kristofer L. Haggerty

(57) ABSTRACT

A computer broadcasts a tier 1 signal from a target device and records transmission data of the broadcast. The computer detects the tier 1 signal at nearby propagator devices and records additional transmission data before determining whether a propagation limit has been reached. Based on not reaching the propagation limit, the computer instructs the nearby propagator devices to broadcast a tier 2 signal. The computer records further transmission data at other nearby propagator devices detecting the tier 2 signal and, again, determines whether the propagation limit has been reached. Based on determining that the propagation limit has been reached, the computer filters outliers from all the transmission data and determines the precise location of the target device. Furthermore, the computer displays the relative location of the target device on one or more devices.

20 Claims, 4 Drawing Sheets

(51) Int. Cl.
*G01S 5/02* (2010.01)
*G01S 19/24* (2010.01)
*G01S 19/31* (2010.01)

(58) Field of Classification Search
USPC .................. 342/451, 357.63, 357.71, 464
See application file for complete search history.

(56) References Cited

U.S. PATENT DOCUMENTS

| | | | | |
|---|---|---|---|---|
| 8,606,293 | B2* | 12/2013 | Kim | G06O 30/0261 455/456.1 |
| 8,639,266 | B2* | 1/2014 | Zelinka | G01S 5/0284 455/404.1 |
| 8,644,113 | B2 | 2/2014 | Harrell et al. | |
| 8,831,761 | B2 | 9/2014 | Kemp et al. | |
| 9,252,896 | B2* | 2/2016 | Edge | H04W 8/005 |
| 9,730,016 | B2* | 8/2017 | Oberbeck | H04W 4/021 |
| 2009/0322603 | A1* | 12/2009 | Liao | G01S 5/0257 342/357.29 |
| 2011/0294515 | A1* | 12/2011 | Chen | H04W 64/00 455/456.1 |
| 2011/0301730 | A1* | 12/2011 | Kemp | G10L 19/008 700/94 |
| 2012/0142378 | A1* | 6/2012 | Kim | H04N 21/41407 455/456.6 |
| 2014/0141804 | A1* | 5/2014 | Zelinka | G01S 5/0284 455/456.2 |
| 2014/0355785 | A1 | 12/2014 | Taylor et al. | |
| 2015/0054684 | A1* | 2/2015 | Ejima | G01S 5/02 342/357.51 |
| 2015/0156746 | A1* | 6/2015 | Home | G01S 5/0205 455/456.6 |

FOREIGN PATENT DOCUMENTS

| | | |
|---|---|---|
| CN | 102522082 B | 7/2013 |
| CN | 103188604 A | 7/2013 |

OTHER PUBLICATIONS

Unknown, "Transferring data from Android using Audio," http://sudarmuthu.com/blog-transferring-data-from-android-using-audio/, 5 pgs., printed Mar. 28, 2016 8:56 AM.

Unknown, "Transferring data using audio signal in android," http://www.slideshare.net/Sudar/transferring-data-using-audio-signal-in-android, 23 pgs., printed Jan. 5, 2016.

Zundt et al., "Realizing Peer-to-Peer Location-Based Services in Mobile Networks," http://www.wpnc.net/fileadmin/WPNC05/Proceedings/Realizing_Peer-to-Peer_Location-Based Services_in_Mobile Networks.pdf, pp. 175-182, Proceedings of the 2nd Workshop on Positioning, Navigation and Communication (WPNC'05) & 1st Ultra-Wideband Expert Talk (UET'05).

Xiangting, C. "[Meet] xBeacon—Venture Star indoor positioning using Bluetooth 4.0 technology, business advertising more accurate!" http://www.bnext.com.tw/article/view/id/30999, 6 pgs., printed Mar. 29, 2016.

Unknown, "Personal navigation era—high precision indoor positioning technology allows you to escape detection," http://www.eettaiwan.com/emag/1402_04_SL.html#.Vvqm90ZWIwE, 9 pgs, Electronic Engineering Times, Digital Edition, Feb. 2014.

Zhenghan, L., "Aspects of indoor positioning system using technology," http://www.ithome.com.tw/tech/86650, 12 pgs., Apr. 16, 2014.

Zhenghan, L., "Apple aura blessing Bluetooth Beacon indoor location-based applications into the big black horse," http://www.ithome.com.tw/tech/86653, 12 pgs., Apr. 16, 2014.

* cited by examiner

US 10,228,445 B2

SIGNAL PROPAGATING POSITIONING SYSTEM

TECHNICAL FIELD

The present invention relates generally to location positioning systems, and more particularly to identifying the precise location of a user using signal propagation.

BACKGROUND

One of the most popular features on mobile devices is location based service. Many applications rely on location based service, such as applications which provide directions or suggest local entertainment. Currently, these services are based on values provided by existing positioning technologies, such as a global position system (GPS). Positioning systems, such as GPS, rely on signals broadcasted by four or more satellites which detail the satellite identity, the time of transmission, and the location of transmission. Based on the time it takes a GPS receiver to receive a signal from each of the four satellites, the locations from which the signals were sent, and the speed at which the signals travel, GPS modules are capable of determining the location of a corresponding device. While these positioning technologies are extremely useful at identifying large targets, such as streets and buildings, the current technologies lack the granularity to precisely determine locations of smaller targets.

SUMMARY

Embodiments of the present invention disclose a method, system, and computer program product for a signal propagating positioning system. A computer broadcasts a tier 1 signal from a target device and records transmission data of the broadcast. The computer detects the tier 1 signal at nearby propagator devices and records additional transmission data before determining whether a propagation limit has been reached. Based on determining that the propagation limit has not been reached, the computer instructs the nearby propagator devices to broadcast a tier 2 signal. The computer records further transmission data at other nearby propagator devices detecting the tier 2 signal and, again, determines whether the propagation limit has been reached. Based on determining that the propagation limit has been reached, the computer filters outliers from all the transmission data and determines the precise location of the target device. Furthermore, the computer displays the relative location of the target device on one or more devices.

DETAILED DESCRIPTION

Embodiments of the present invention will now be described in detail with reference to the accompanying figures.

Figure 1:
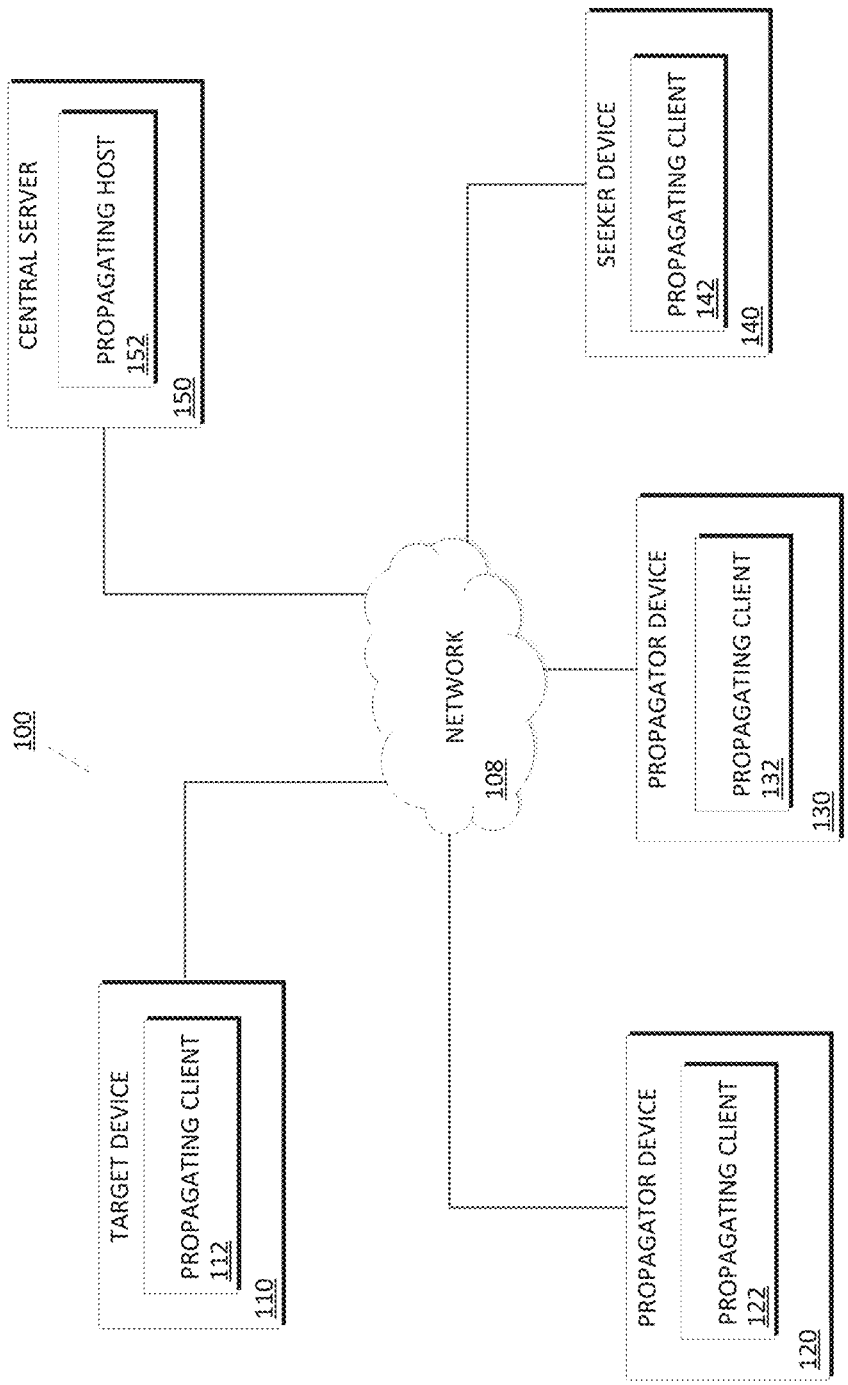
FIG. 1 illustrates a signal propagating positioning system, in accordance with an embodiment of the present invention.

FIG. 1 illustrates a signal propagating positioning system 100, in accordance with an embodiment of the invention. In the example embodiment, signal propagating positioning system 100 includes target device 110, propagator device 120, propagator device 130, seeker device 140, and central server 150, all interconnected via network 108.

In the example embodiment, network 108 may be the Internet, representing a worldwide collection of networks and gateways to support communications between devices connected to the Internet. Network 108 may include, for example, wired, wireless, or fiber optic connections. In other embodiments, network 108 may be implemented as an intranet, a local area network (LAN), or a wide area network (WAN). In general, network 108 can be any combination of connections and protocols that will support communications between target device 110, propagator device 120, propagator device 130, seeker device 140, and central server 150.

In the example embodiment, target device 110 includes propagating client 112 and is a device associated with a user physically inhabiting a target location sought by others, such as the user of seeker device 140. In the example embodiment, target device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While target device 110 is shown as a single device, in other embodiments, target device 110 may be comprised of a cluster or plurality of computing devices, working together or working separately. In the example embodiment, target device 110 includes a Global Positioning System (GPS) module capable of identifying coordinate locations detailing the location of target device 110. In addition, target device 110 further includes hardware components, such as a microphone and/or antenna, capable of detecting broadcasted signals within the electromagnetic spectrum, such as sounds or radio waves. Furthermore, target device 110 further includes hardware components, such as speakers, capable of broadcasting signals within the electromagnetic spectrum, such as audio or radio waves. Target device 110 is described in more detail with reference to FIG. 5.

In the example embodiment, propagating client 112 is a client program on target device 110 which maintains a client-server relationship with a server program, such as propagating host 152 on central server 150. In the example embodiment, propagating client 112 is capable of communicating with integrated hardware (for example, microphones, antennas, and speakers) and radio/audio frequency analysis software on target device 110 in order to detect and broadcast high/low frequency signals. Furthermore, in the example embodiment, propagating client 112 is capable of transmitting signal transmission data, such as GPS information, times of transmission and times of reception, to propagating host 152.

In the example embodiment, propagator device 120 includes propagating client 122 and is a device associated with a first bystander within the vicinity of the user of target device 110. In the example embodiment, propagator device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While propagator device 120 is shown as a single device, in other embodiments, propagator device 120 may be comprised of a cluster or plurality of computing devices, working together or working separately. In the example embodiment, propagator device 120 includes a Global Positioning System (GPS) module capable of identifying coordinate locations detailing the location of propagator device 120. In addition, propagator device 120 further includes hardware components, such as a microphone and/or antenna, capable of detecting broadcasted signals within the electromagnetic spectrum, such as sounds or radio waves. Furthermore, propagator device 120 further includes hardware components, such as speakers, capable of broadcasting signals within the electromagnetic spectrum, such as audio radio waves. Propagator device 120 is described in more detail with reference to FIG. 5.

In the example embodiment, propagating client 122 is a client program on propagator device 120 which maintains a client-server relationship with a server program, such as propagating host 152 on central server 150. In the example embodiment, propagating client 122 is capable of communicating with integrated hardware (for example, microphones, antennas, and speakers) and radio/audio frequency analysis software on propagator device 120 in order to detect and broadcast high/low frequency signals. Furthermore, in the example embodiment, propagating client 122 is capable of transmitting signal transmission data, such as GPS information, times of transmission and times of reception, to propagating host 152.

In the example embodiment, propagator device 130 includes propagating client 132 and is a device associated with another bystander within the vicinity of the user of propagator device 120 (or target device 110). In the example embodiment, propagator device 130 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While propagator device 130 is shown as a single device, in other embodiments, propagator device 130 may be comprised of a cluster or plurality of computing devices, working together or working separately. In the example embodiment, propagator device 130 includes a Global Positioning System (GPS) module capable of identifying coordinate locations detailing the location of propagator device 130. In addition, propagator device 130 further includes hardware components, such as a microphone and/or antenna, capable of detecting broadcasted signals within the electromagnetic spectrum, such as sounds or radio waves. Furthermore, propagator device 130 further includes hardware components, such as speakers, capable of broadcasting signals within the electromagnetic spectrum, such as radio waves. Propagator device 130 is described in more detail with reference to FIG. 5.

In the example embodiment, propagating client 132 is a client program on propagator device 130 which maintains a client-server relationship with a server program, such as propagating host 152 on central server 150. In the example embodiment, propagating client 132 is capable of communicating with integrated hardware (for example, microphones, antennas, and speakers) and radio/audio frequency analysis software on propagator device 130 in order to detect and broadcast high/low frequency signals. Furthermore, in the example embodiment, propagating client 132 is capable of transmitting signal transmission data, such as GPS information, times of transmission and times of reception, to propagating host 152.

In the example embodiment, seeker device 140 includes propagating client 142 and is a device associated with a user who seeks to reach the user of target device 110. In the example embodiment, seeker device 140 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While seeker device 140 is shown as a single device, in other embodiments, seeker device 140 may be comprised of a cluster or plurality of computing devices, working together or working separately. In the example embodiment, seeker device 140 includes a Global Positioning System (GPS) module capable of identifying coordinate locations detailing the location of seeker device 140. In addition, seeker device 140 further includes hardware components, such as a microphone and/or antenna, capable of detecting broadcasted signals within the electromagnetic spectrum, such as sounds or radio waves. Furthermore, seeker device 140 further includes hardware components, such as speakers, capable of broadcasting signals within the electromagnetic spectrum, such as radio waves. Seeker device 140 is described in more detail with reference to FIG. 5.

In the example embodiment, propagating client 142 is a client program on seeker device 140 which maintains a client-server relationship with a server program, such as propagating host 152 on central server 150. In the example embodiment, propagating client 142 is capable of communicating with integrated hardware (for example, microphones, antennas, and speakers) and radio/audio frequency analysis software on seeker device 140 in order to detect and broadcast high/low frequency signals. Furthermore, in the example embodiment, propagating client 142 is capable of transmitting signal transmission data, such as GPS information, times of transmission and times of reception, to propagating host 152.

In the example embodiment, central server 150 includes propagating host 152. In the example embodiment, central server 150 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While central server 150 is shown as a single device, in other embodiments, central server 150 may be comprised of a cluster or plurality of computing devices, working together or working separately. Central server 150 is described in more detail with reference to FIG. 5.

In the example embodiment, propagating host 152 is a server program on central server 150 which maintains a client-server relationship with one or more client programs, such as propagating clients 112, 122, 132, and 142. In the example embodiment, propagating host 152 is capable of triggering the transmission of a tier 1 signal having a first frequency from a device containing a signal propagating client, such as propagating client 112 on target device 110. Propagating host 152 is further capable of detecting the tier 1 signal at one or more nearby propagating clients, such as propagating clients 122 on propagator devices 120, and recording signal transmission data corresponding to the tier 1 signal. Propagating host 152 is further capable of determining, based on the detected signals, whether the propagation limit has been reached and, if not, propagating a tier 2 signal at propagating clients 122 which have received the tier 1 signal. Similarly, propagating host 152 is capable of detecting the transmitted tier 2 signal at other nearby propagating clients, such as propagating clients 132 on propagator devices 130, by receiving signal transmission data from those propagator devices and, in response, recording those signal transmission data corresponding to the tier 2 signal. If propagating host 152 determines that the propagation limit has been reached, propagating host 152 is capable of processing the recorded signal transmission data and determining the precise location of the target device. Propagating host 152 is then capable of displaying the precise location of target device 110 on devices in interest, such as seeker device 140 and determining whether seeker device 140 has reached target device 110. While, in the example embodiment, propagating host 152 is location on central server 150, in other embodiments, propagating host 152 may be located elsewhere, such as on seeker device 140. The operation of propagating host 152 is graphically depicted in FIG. 3 and described in detail with regard to FIG. 2, below.

Figure 2:
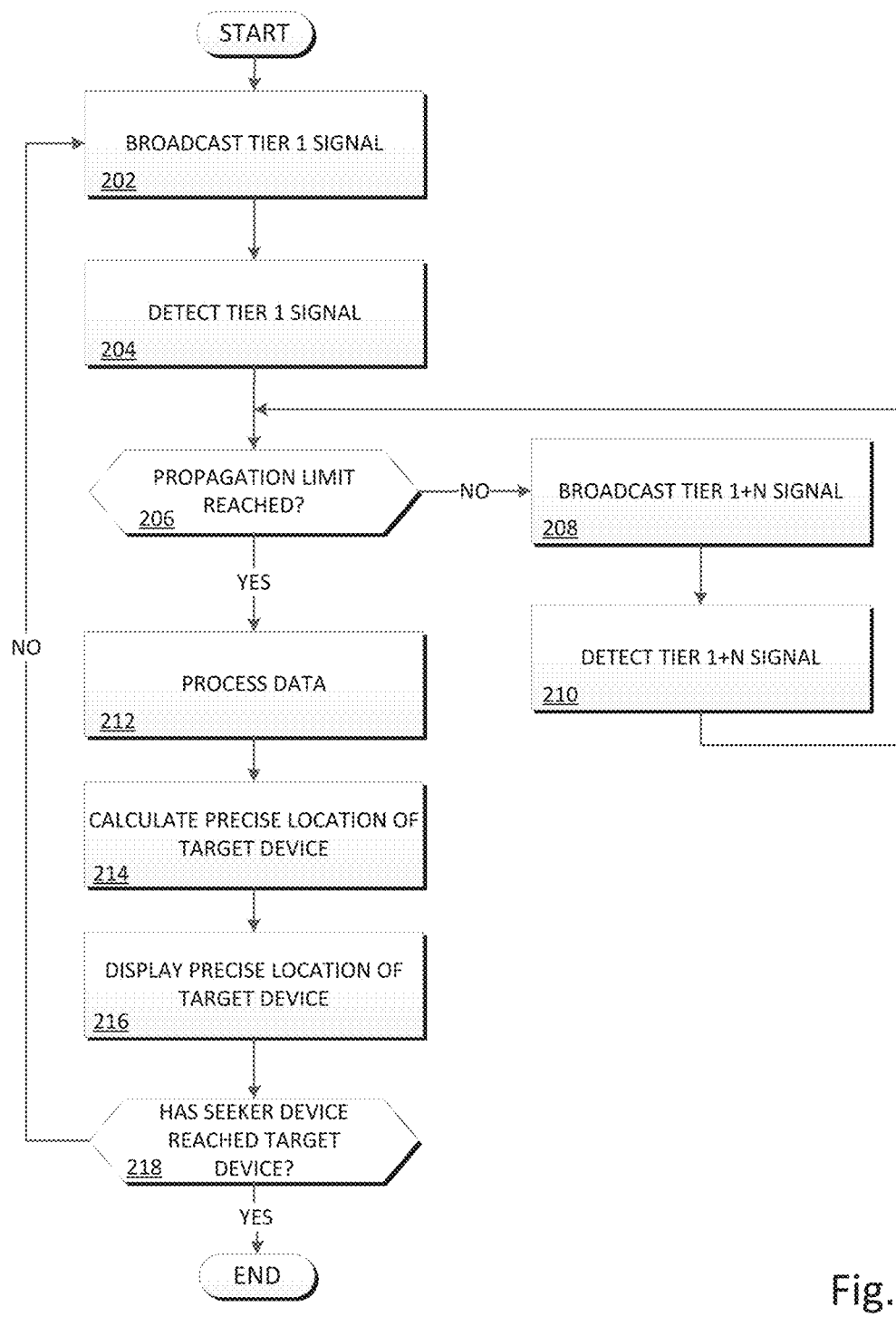
FIG. 2 is a flowchart illustrating the operation of the propagating host of FIG. 1 in determining the precise location of a device based on signal propagation, in accordance with an embodiment of the present invention.

FIG. 2 is a flowchart depicting the operation of propagating host 152 in determining the precise location of a target device using signal propagation, in accordance with an embodiment of the invention. Propagating host 152 receives a request from either target device 110 or seeker device 140 to first broadcast a specific frequency (tier 1) signal from the target device that is detectable by nearby propagator devices. Propagating host 152 records the time and location at which the signal was broadcasted by the target device as well as the times and locations at which the tier 1 signal was received by the nearby propagator devices. Propagating host 152 then determines whether enough data has been collected to determine the precise location of the target device based on the recorded signal transmission data. If not, propagating host 152 instructs the nearby propagator devices which have received the tier 1 signal to modify and broadcast the signal as a tier 2 signal to additional nearby devices, effectively increasing the area by which nearby propagator devices are identified. Similarly, propagating host 152 records signal transmission data associated with the tier 2 signal as it is received at the additional nearby devices. This process is repeated until enough data is collected to determine the relative locations of the nearby devices and deduce a precise location of the target device.

With reference to FIG. 2, in the example embodiment, propagating host 152 receives a request to broadcast a tier 1 signal at a target device (step 202). In the example embodiment, a user of target device 110, referred to as the target user, utilizes a user interface of propagating client 112 in order to request a signal broadcast at target device 110. In other embodiments, however, a different user may utilize another user interface in order to request a signal broadcast at target device 110, such as a user seeking the target user (referred to as a seeker user) utilizing propagating client 142 on seeker device 140. Propagation host 152 then receives the signal broadcast request via network 108. At any time during or after a signal broadcast is requested, one or more users, such as the target user or the seeker user, may similarly utilize the user interface of a propagating client 112/142 to input identification information of devices associated with one or more seekers, such as seeker device 140, who are seeking the target user/target device 110. Propagation host 152 similarly receives the identification information of seeker device 140 via network 108, then determines the approximate geographic location of both the target user and the seeker user by communicating with the integrated GPS modules of target device 110 and seeker device 140. While the GPS coordinates (obtained from utilizing a GPS module) corresponding to a device, such as target device 110, are accurate enough to locate, for example, a building in which the device is located, GPS coordinates lack the granularity to determine, for example, the precise office in which the device is located. Thus, GPS coordinates are utilized by propagator host 152 as a starting point from which more granular locational positioning can be obtained. Next, propagating host 152 associates a tier 1 signal having a first frequency with propagating client 112 within a frequency database and instructs propagating client 112 to broadcast the tier 1 signal through integrated hardware, such as speakers, of target device 110. Information regarding the transmission, such as who (which device), what (frequency tier), where (location of transmission), and when (time of transmission) are recorded by (or, in other embodiments, transmitted to) propagating host 152 as the signal is broadcasted from target device 110.

The tier 1 signal broadcasted by propagating client 112 includes the device identification number associated with target device 110 (or propagating client 112) and may further include other information, such as the times and locations of the broadcast(s) (note that the aforementioned information is recorded by propagating host 152 regardless of whether the information is broadcasted within the signal) (step 202 cont'd). The frequency at which the signal is broadcasted is configured to be undetectable/inaudible to humans and may vary based on the application and other considerations, such as the operating frequencies of nearby electronics or wildlife. In the example embodiment, the signal is broadcasted outward from the target device in a spherical shape and the range at which the signal is broadcasted may be configured for specific situations and hardware. Similarly, the duration for which the signal is broadcasted may be configured for any user defined duration. In the example embodiment, the duration of the broadcast is defined as the time it takes seeker device 140 to get within a threshold range of target device 110. In other embodiments, the duration may be configured for a predefined amount of time, a predefined number of broadcasts, until a defined number of devices detect the signal, or until a number of devices are within a defined proximity of one another/the target device.

Referring now to an example, the user of target device 110, Target, is expecting the user of seeker device 140, Seeker, to arrive at a crowded football stadium where Target awaits. If Target utilizes the user interface of propagating client 112 on target device 110 to request a signal broadcast, then propagating host 152 determines the approximate geographic location of Target by communicating with the GPS module of target device 110. Propagating host 152 additionally assigns a tier 1 signal to propagating client 112 and instructs propagating client 112 to broadcast a tier 1 signal identifying propagating client 112. Propagating host 152 then retrieves signal transmission data associated with the tier 1 signal from propagating client 112, such as the times and locations of the broadcast. Furthermore, if Target identifies the device associated with a friend, Seeker, as seeker device 140, then propagating host 152 determines the approximate geographic location of Seeker by communicating with the GPS module of seeker device 140. In other embodiments, Seeker may utilize the user interface of propagating client 142 on seeker device 140 in order to request a signal broadcast at target device 110 and/or identify seeker device 140. The aforementioned example is graphically depicted in FIG. 3 for further reference.

Now referring back to the flowchart illustrated in FIG. 2, propagating host 152 detects the tier 1 signal at one or more propagator devices by receiving the associated signal transmission data (step 204). In the example embodiment, propagating host 152 determines which nearby propagator devices detect the tier 1 signal by determining which signal propagating clients are associated with devices that are within the geographic area of target device 110. In the example embodiment, propagating host 152 communicates with the GPS module of propagator devices 120 via network 108 in order to determine whether propagator devices 120 are within a specific radius, r, of target device 110. In the example embodiment, the specific radius, r, is input by a user configuring propagating host 152. If coordinates corresponding to propagator devices 120 are within the specific radius, r, of the coordinates corresponding to target device 110, propagating host 152 monitors information received by integrated hardware, such as a microphone or antenna, on propagator devices 120 to detect the tier 1 signal. In other embodiments, propagator host 152 may determine which propagator devices to monitor via alternative means.

Upon detecting the tier 1 signal at propagator devices 120, propagating host 152 first identifies a device identification number associated with a detecting propagator device 120 by communicating with propagating client 122 (step 204 cont'd). Propagating client 122 then determines the frequency of the signal by utilizing hardware, such as microphones or antennas, of computing device 120 to receive a signal and measuring the frequency of the signal using radio frequency analysis equipment/software. Propagating host 152 then receives the determined frequency by communicating with propagating client 122 via network 108 and identifies an associated tier by comparing the determined frequency to a database detailing the frequencies associated with each tier of the signal, in accordance with the predefined convention. Accurately assigning and recording frequencies associated with each target device is particularly important for instances where multiple users are broadcasting a corresponding location within the same approximate area. Lastly, propagating host 152 creates a timestamp detailing the time of detection and records the geographic coordinates at which propagator devices 120 detected the tier 1 signal. Thus, based on the detected signal, propagating host 152 determines the identity of the broadcasting device (device ID included in the broadcast), the tier at which the signal is broadcasted (based on the measured frequency and predefined convention), the time at which the signal was received by each of propagator devices 120 (timestamp), and the location at which the signal was received by each of propagator devices 120 (recorded geographic coordinates). Continuing the example illustrated by FIG. 3 wherein Target broadcasts a tier 1 signal from target device 110, if the coordinates corresponding to propagator devices 120 are within the specified range, r, of the coordinates corresponding to target device 110, then propagating host 152 monitors hardware components, such as speakers or antennas, of propagator devices 120 to detect a signal. In response to detecting a signal at propagator devices 120, propagating host 152 records the identity of propagator devices 120 detecting the signal and references a database detailing the frequencies associated with broadcasted signals to determine that the detected signal is a tier 1 signal. Propagating host 152 then records the times and locations at which the tier 1 signal was detected by propagator devices 120. As previously mentioned, this example is graphically illustrated by FIG. 3.

Now referring back to FIG. 2, propagating host 152 determines whether the propagation limit has been reached (decision 206). In the example embodiment, the propagation limit may include limiting the number of signal tiers, the number of devices propagating signals per tier, or a combination of both. In other embodiments, propagation limits may also take into account other factors, such as the distance between the coordinates corresponding to devices detecting the signal and the coordinates corresponding to the target device. In the example embodiment, propagating host 152 determines whether the propagation limit has been reached by comparing propagation limits configured by a user, such as the user of target device 110, to the data recorded by propagating host 152 as each of the propagator devices detect the broadcasted signals. As the FIG. 3 diagram illustrates, tiers increase in an outward direction from TD110 (target device 110) and are utilized to identify layers of similarly situated propagator devices (in other words, devices equidistant to the target device). As a group of propagator devices, such as propagator devices 120, receive the tier 1 signal, propagating host 152 records signal transmission data and, if the propagation limit is not yet reached, instructs propagator devices 120 to broadcast (or forward/relay) a signal corresponding to the next tier (tier 2). Note that target device 110 continues to broadcast a tier 1 signal until the user configured duration is met even when propagator devices 120 begin broadcasting a tier 2 signal. Propagator host 152 then monitors propagator devices 130 within range, r, of propagator devices 120 for detection of the tier 2 signal broadcasted by propagator devices 120. Upon detection of the tier 2 signal, propagator host 152 records signal transmission data regarding the tier 2 signal, and, if the propagation limit is still not yet reached, instructs propagator devices 130 to broadcast a tier 3 signal. Again, note that propagator devices 120 will continue to broadcast a tier 2 signal until the user configured duration is met, regardless of whether propagator devices 130 are instructed to broadcast a tier 3 signal. Repeating this process creates an incremental increase in tiers in an outward direction from target device 110, thereby increasing the area from which data is collected. While increasing the amount of collected data increases the accuracy at which the target device is pinpointed, it does so at the cost of efficiency. Please refer to FIG. 3 for a graphical depiction of the operation of propagating host 152.

Propagation limits may be imposed to reduce the strain applied to devices, networks, and servers that occur when large amount of data are frequently collected (decision 206 cont'd). As such, propagating host 152 may be configured to end propagation when a specific signal tier or number of devices overall/per tier is reached. For example, if propagating host 152 determines that a tier 1 signal has been detected and the propagation limit is 10 tiers, propagating host 152 prevents propagator devices detecting the tier 10 signal from broadcasting a tier 11 signal. Similarly, if the device limit for propagating each tier signal is ten devices and the tier 8 signal is currently being broadcasted by 10 devices, then propagating host 152 no longer instructs future signal propagating clients which receive the tier 7 signal to broadcast the tier 8 signal. Propagating host 152 may be further configured to implement a different device limit for each tier. For example, propagating host 152 may be configured to broadcast a tier 1 signal from a maximum of 20 devices and to broadcast a tier 2 signal from a maximum of 15 devices, and so forth.

If propagating host 152 determines that the propagation limit is not yet reached (decision 206 "NO" branch), propagating host 152 instructs propagator devices N to broadcast a tier 1+N signal (step 208). Note that the variable N represents the last tier of devices which received a signal based on how many loops propagating host 152 has run. Propagating host 152 then instructs the propagator devices which have received the highest tier signal, N, to broadcast the next highest tier signal, 1+N. Broadcasting the 1+N signal is done in much the same manner as the tier 1 signal is broadcasted in step 202, however, here the signal is broadcasted at frequency 1+N from an alternative propagator device. Using the example above as an illustration, if the propagation limit is 3 tiers and propagating host 152 detects the tier 1 signal at propagator devices 120, then propagator host 152 determines that the propagation limit has not yet been reached and instructs propagator devices 120 to broadcast a tier 2 signal.

Propagating host 152 detects the tier 1+N signal (step 210). In the example embodiment, propagating host 152 detects the tier 1+N signal in a similar manner to that of how propagating host 152 detects the tier 1 signal in step 204. Here, however, propagating host 152 is detecting a different frequency signal, namely the tier 1+N frequency signal. Continuing the example above, if propagator devices 120 are broadcasting a tier 2 signal, then propagator host 152 detects the tier 2 signal at propagator devices 130 and records signal transmission data regarding the tier 2 signal.

Note that steps 206, 208, and 210 will repeat to the 1+N$^{th}$ degree until the propagation limit is reached or a predefined amount of time has elapsed. Propagating host 152 may be configured to end after a predefined amount of time in the case that not enough devices are available in the surrounding area to reach the propagation limit. Also note that increasing the number of tiers does not have an effect on the propagator devices which are already propagating a signal.

Figure 3:
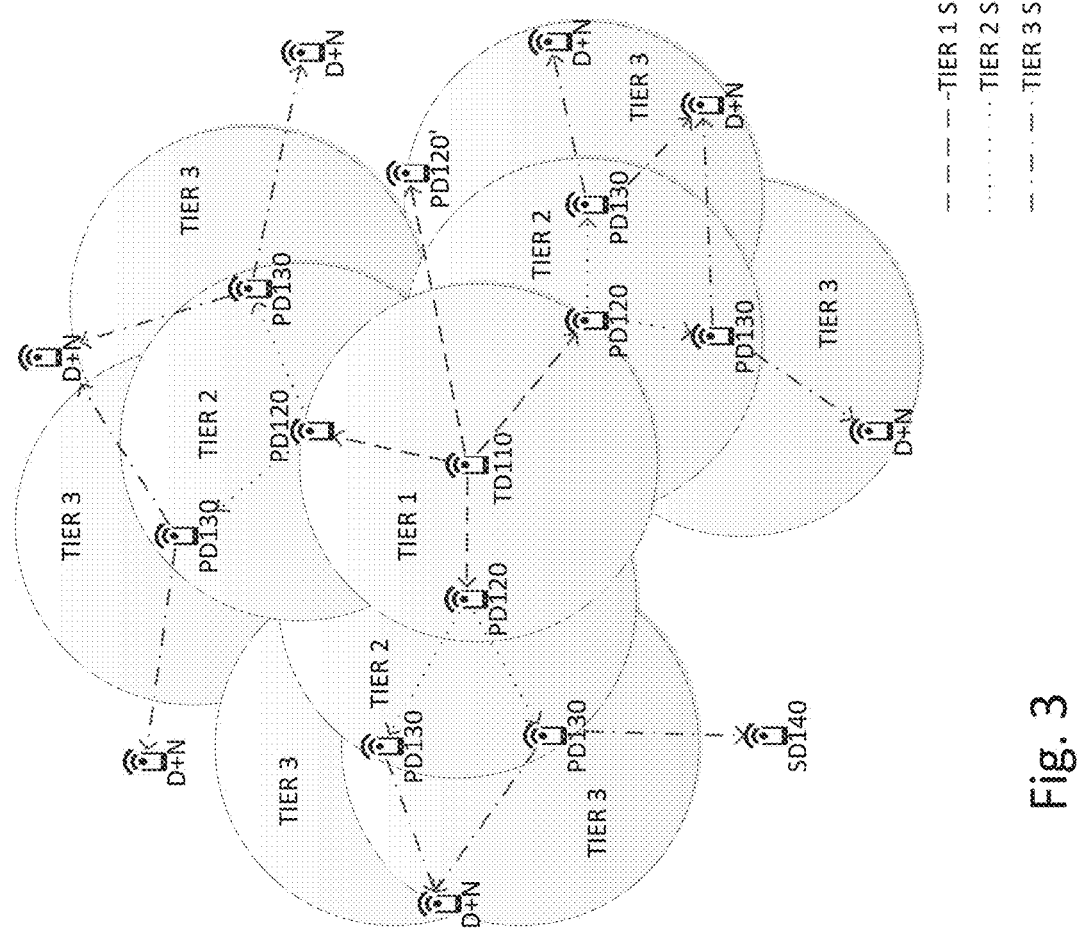
FIG. 3 is a diagram graphically illustrating the operation of the signal propagating positioning system of FIG. 1 in determining the precise location of a device using signal propagation, in accordance with an embodiment of the present invention.

If propagating host 152 determines that the propagation limit has been reached (decision 206 "YES" branch), propagation host 152 processes the signal transmission data (step 212). Propagating host 152 first removes any signal transmission data which was obtained from devices with the same GPS coordinates as the target device. Next, propagating host 152 analyzes the signal transmission data to identify any outliers. Propagator devices which detected signals are initially broken down into tiers based on the signal they broadcast (or would broadcast should the propagation limit be reached). For example, if a propagator device receives a tier 1 signal, then the propagator device is initially considered to be within tier 2 because it will or would broadcast a tier 2 signal. However, signal transmission data from propagator devices may be excluded from the overall signal transmission data of a tier if specific characteristics of the propagator device, such as distance from target device 110 or time elapsed for a signal to reach the propagator device, is inconsistent with the specific characteristics of the other propagator devices within the same tier. Referring to FIG. 3, most devices which broadcasted a tier 2 signal (propagator devices 120) are approximately equidistant to the target device except for one propagator device 120' (prime) located far enough away to be within tier 3. Propagating host 152 removes data received by outlier devices such as PD120' by determining, per tier, an average straight-line distance between the GPS coordinates at which a propagator device received a signal and the GPS coordinates of the target device. If the distance between the GPS coordinates at which a propagator device received a signal and the target device is beyond a threshold deviation, such as ±25%, from the average distance of the other propagator devices in the same tier, it is filtered from the usable results.

The second means by which propagating host 152 determines outliers in the data is by determining whether the time it took a propagator device to detect a signal is beyond a threshold time limit. By retrieving a timestamp at every broadcast and detection of a signal, propagating host 152 is capable of determining the time it took a propagator device to receive a signal from the device before it. These numbers can be added, averaged, and normalized based on the tier and how many devices previously broadcasted the signal. If the amount of time it took a propagator device to receive a signal deviates beyond a threshold amount, such as ±25%, of the average time of other propagator devices in the same tier, the outlier is excluded from the usable results. Continuing the example above, if propagator host determines that, on average, propagator devices 120 are average distance, ad, from target device 110 and PD120' is 1.5 ad, then the signal transmission data associated with PD120' is excluded out of the usable data. Similarly, if the elapsed time for the tier 1 signal to reach PD120s is t and it took time 1.5 t to read PD120', then PD120' data is excluded from the usable data.

Figure 4:
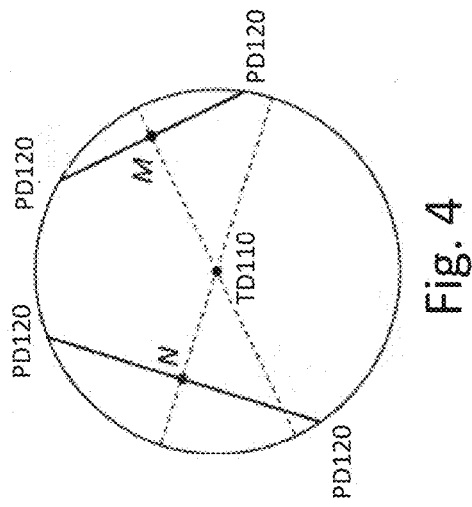
FIG. 4 is a diagram illustrating a perpendicular bisector, in accordance with an embodiment of the present invention.

Propagating host 152 determines the precise location of the target device (step 214). In the example embodiment, propagating host 152 determines the precise location of the target device via a perpendicular bisector technique. Perpendicular bisector relies on the theory that for any chord (line) through a circle, the perpendicular bisector of that chord passes through the geometric center of the circle. This principle is illustrated by FIG. 4 where four propagator devices 120 of the same tier form a rough circle around target device 110. By connecting propagator devices 120 in pairs of two, two chords are formed (chords are illustrated by solid lines in FIG. 4). Drawing perpendicular lines to the chords at the midpoints (bisectors) M and N result in perpendicular bisectors (dotted lines) which pass through the geometric center of the circle. Using this principle, the point at which the perpendicular bisectors cross identifies the center of the circle. With a minimum of two perpendicular bisectors, propagating host 152 is capable of determining the geographic center (target device) of the circle (tier). Perpendicular bisector is advantageous because the propagator devices can be located at any point around the rough circle formed by the propagator devices. In addition, any devices within the same tier can be paired, regardless of location. While four reference devices are utilized in the example illustrated by FIG. 4, any number of propagator devices greater than three devices is capable of providing an accurate result. Utilizing a perpendicular bisector technique to determine the precise location of target device 110 achieves a greater accuracy of locational positioning at a more granular level than traditional GPS coordinates. For example, GPS coordinates may indicate the approximate location of a user within the broad vicinity of a concert venue, however lacks the granularity to identify the seats in which a user is sitting. In other embodiments, propagating host 152 may determine the location of the target device using other techniques, such as triangulation, trilateration, multilateration, and hyperbolic navigation.

Referring back to the flowchart of FIG. 2, propagating host 152 displays the location of the target device within a user interface (step 216). In the example embodiment, propagating host 152 transmits the location information via network 108 in order to display the locations of target device 110 and seeker device 140 on the user interfaces of propagating clients 112 and 142. In other embodiments, more or less devices may be displayed on more or less user interfaces based on user preferences. In the example embodiment, the display may be adjustable to zoom in and out and may further include other landmarks or references to aid in positioning.

Referring back to the flowchart of FIG. 2, propagating host 152 determines whether the seeker device has reached the target device (decision 218). In the example embodiment, propagating host 152 determines whether seeker device 140 has reached target device 110 by communicating with the GPS module of target device 110 and seeker device 140. Propagating host 152 then determines whether the GPS coordinates associated with seeker device 140 are within a threshold distance of target device 110. In other embodiments, propagating host 152 may determine whether seeker device 140 has reached target device 110 via other means, such as determining whether seeker device 140 receives signals from target device 110 and, if so, deducing the distance between the devices based on the time and speed of signal transmission.

If propagating host 152 determines that the seeker device has not reached the target device (decision 218, "NO" branch), propagating host 152 reiterates the method steps to update the relative positions of the target, seeker, and propagator devices involved. This step ensures that even if the target, seeker, and/or propagator devices move before the seeker reaches the target, the display is up to date.

If propagating host 152 determines that the seeker device has reached the target device (decision 216, "YES" branch), then propagating host 152 ends.

FIG. 3 is a graphical depiction of the operations of propagating host 152 in determining the location of a target user via signal propagation.

FIG. 4 is a graphical representation of the mathematical principle of perpendicular bisector.

Figure 5:
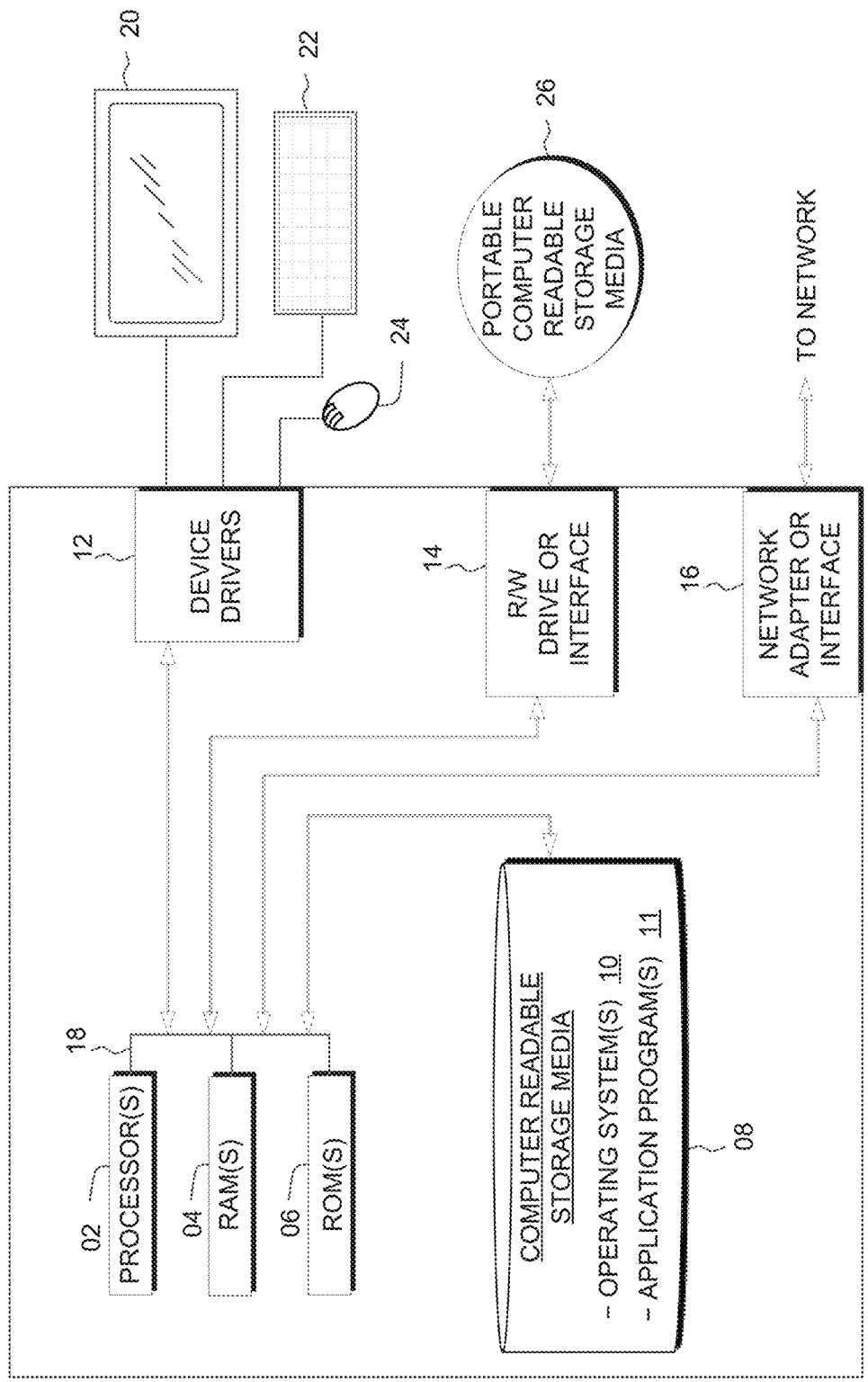
FIG. 5 is a block diagram depicting the hardware components of the signal propagating positioning system of FIG. 1, in accordance with an embodiment of the invention.

FIG. 5 depicts a block diagram of components of target device 110 of a contact information distributing system 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Target device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example, propagating host 152, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Target device 110 may also include a R/W drive or interface 14 to read from and write to one or more portable computer readable storage media 26. Application programs 11 on target device 110 may be stored on one or more of the portable computer readable storage media 26, read via the respective R/W drive or interface 14 and loaded into the respective computer readable storage media 08.

Target device 110 may also include a network adapter or interface 16, such as a TCP/IP adapter card or wireless communication adapter (such as a 4G wireless communication adapter using OFDMA technology). Application programs 11 on target device 110 may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Target device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A method for a signal propagating positioning system, the method comprising:
   receiving, by a computer, a request to broadcast a first signal;
   instructing, by the computer, a first device to broadcast the first signal;
   receiving, by the computer, a first transmission time and a first transmission location associated with the broadcasted first signal;
   receiving, by the computer, a first data, wherein the first data includes one or more first detection times and one or more first detection locations from one or more second devices, and wherein receiving the first data is based on the one or more second devices detecting the first signal; and
   determining, by the computer, whether a precise location of the first device can be determined based on the first data.

2. The method of claim 1, further comprising:
based on determining that a precise location of the first device cannot be determined based on the first data, instructing, by the computer, the one or more second devices to broadcast a second signal;
receiving, by the computer, one or more second transmission times and one or more second transmission locations associated with the broadcasted second signal; and
receiving, by the computer, a second data, wherein the second data includes one or more second detection times and one or more second detection locations from one or more third devices, wherein receiving the second data is based on the one or more third devices detecting the broadcasted second signal.

3. The method of claim 1, further comprising:
based on determining that a precise location of the first device can be determined based on the first data, updating, by the computer, the first data by removing data corresponding to one or more outliers from the first data; and
determining, by the computer, the precise location of the first device based on the updated first data.

4. The method of claim 3, wherein the request to broadcast the first signal is transmitted by a fourth device, and further comprising:
displaying, by the computer, the precise location of the first device on a display of the fourth device.

5. The method of claim 4, further comprising:
determining, by the computer, whether the fourth device is within a threshold distance of the first device; and
based on determining that the fourth device is within the threshold distance of the first device, instructing, by the computer, the first device to cease broadcasting the first signal.

6. The method of claim 3, wherein the step of determining the precise location of the first device based on the updated first data further comprises:
generating, by the computer, two or more geometric chords between the one or more second devices;
bisecting, by the computer, each of the two or more geometric chords with a perpendicular bisector; and
determining, by the computer, where the perpendicular bisector for each of the two or more geometric chords meet.

7. The method of claim 3, wherein the step of updating the first data by removing data corresponding to one or more outliers from the first data further comprises:
calculating, by the computer, an average distance between the first device and the one or more second devices based on the received first transmission location and the received one or more first detection locations; and
determining, by the computer, whether a distance between the first device and at least one of the one or more second devices differs from the calculated average distance by a threshold percentage.

8. A computer program product for a signal propagating positioning system, the computer program product comprising:
one or more computer-readable storage media and program instructions stored on the one or more computer-readable storage media, the program instructions comprising:
program instructions to receive a request to broadcast a first signal;
program instructions to instruct a first device to broadcast the first signal;
program instructions to receive a first transmission time and a first transmission location associated with the broadcasted first signal;
program instructions to receive a first data, wherein the first data includes one or more first detection times and one or more first detection locations from one or more second devices, and wherein receiving the first data is based on the one or more second devices detecting the first signal; and
program instructions to determine whether a precise location of the first device can be determined based on the first data.

9. The computer program product of claim 8, further comprising:
based on determining that a precise location of the first device cannot be determined based on the first data, program instructions to instruct the one or more second devices to broadcast a second signal;
program instructions to receive one or more second transmission times and one or more second transmission locations associated with the broadcasted second signal; and
program instructions to receive a second data, wherein the second data includes one or more second detection times and one or more second detection locations from one or more third devices, wherein receiving the second data is based on the one or more third devices detecting the broadcasted second signal.

10. The computer program product of claim 8, further comprising:
based on determining that a precise location of the first device can be determined based on the first data, program instructions to update the first data by removing data corresponding to one or more outliers from the first data; and
program instructions to determine the precise location of the first device based on the updated first data.

11. The computer program product of claim 10, wherein the request to broadcast the first signal is transmitted by a fourth device, and further comprising:
program instructions to display the precise location of the first device on a display of the fourth device.

12. The computer program product of claim 11, further comprising:
program instructions to determine whether the fourth device is within a threshold distance of the first device; and
based on determining that the fourth device is within the threshold distance of the first device, program instructions to instruct the first device to cease broadcasting the first signal.

13. The computer program product of claim 10, wherein the program instructions to determine the precise location of the first device based on the updated first data further comprises:
program instructions to generate two or more geometric chords between the one or more second devices;
program instructions to bisect each of the two or more geometric chords with a perpendicular bisector; and
program instructions to determine where the perpendicular bisector for each of the two or more geometric chords meet.

14. The computer program product of claim 10, wherein the program instructions to update the first data by removing data corresponding to one or more outliers from the first data further comprises:

program instructions to calculate an average distance between the first device and the one or more second devices based on the received first transmission location and the received one or more first detection locations; and program instructions to determine whether a distance between the first device and at least one of the one or more second devices differs from the calculated average distance by a threshold percentage.

15. A computer system for a signal propagating positioning system, the computer system comprising:

one or more computer processors, one or more computer-readable storage media, and program instructions stored on one or more of the computer-readable storage media for execution by at least one of the one or more processors, the program instructions comprising:

program instructions to receive a request to broadcast a first signal;

program instructions to instruct a first device to broadcast the first signal;

program instructions to receive a first transmission time and a first transmission location associated with the broadcasted first signal;

program instructions to receive a first data, wherein the first data includes one or more first detection times and one or more first detection locations from one or more second devices, and wherein receiving the first data is based on the one or more second devices detecting the first signal; and program instructions to determine whether a precise location of the first device can be determined based on the first data.

16. The computer system of claim 15, further comprising:

based on determining that a precise location of the first device cannot be determined based on the first data, program instructions to instruct the one or more second devices to broadcast a second signal;

program instructions to receive one or more second transmission times and one or more second transmission locations associated with the broadcasted second signal; and program instructions to receive a second data, wherein the second data includes one or more second detection times and one or more second detection locations from one or more third devices, wherein receiving the second data is based on the one or more third devices detecting the broadcasted second signal.

17. The computer system of claim 15, further comprising:

based on determining that a precise location of the first device can be determined based on the first data, program instructions to update the first data by removing data corresponding to one or more outliers from the first data; and program instructions to determine the precise location of the first device based on the updated first data.

18. The computer system of claim 17, wherein the request to broadcast the first signal is transmitted by a fourth device, and further comprising:

program instructions to display the precise location of the first device on a display of the fourth device.

19. The computer system of claim 18, further comprising:

program instructions to determine whether the fourth device is within a threshold distance of the first device; and based on determining that the fourth device is within the threshold distance of the first device, program instructions to instruct the first device to cease broadcasting the first signal.

20. The computer system of claim 17, wherein the program instructions to determine the precise location of the first device based on the updated first data further comprises:

program instructions to generate two or more geometric chords between the one or more second devices;

program instructions to bisect each of the two or more geometric chords with a perpendicular bisector; and program instructions to determine where the perpendicular bisector for each of the two or more geometric chords meet.

* * * * *